(12) United States Patent
Deng et al.

(10) Patent No.: US 8,167,360 B2
(45) Date of Patent: May 1, 2012

(54) VEHICLE CROSS MEMBER ASSEMBLY WITH TUNNEL BRACKET

(75) Inventors: Zhibing Deng, Northville, MI (US); Se Kyoon Shin, Northville, MI (US); Shekar Prabhakar Erasala, Northville, MI (US); Bhimaraddi Venkaraddi Alavandi, Canton, MI (US); John Joseph Nizienski, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/843,190

(22) Filed: Jul. 26, 2010

(65) Prior Publication Data

US 2012/0019026 A1    Jan. 26, 2012

(51) Int. Cl.
*B62D 25/20*    (2006.01)
(52) U.S. Cl. .......... 296/187.08; 296/193.02; 296/187.12
(58) Field of Classification Search ............. 296/193.02, 296/187.12, 65.01, 68.1, 193.08, 187.08
See application file for complete search history.

(56) References Cited

U.S. PATENT DOCUMENTS

| | | | | |
|---|---|---|---|---|
| 4,514,008 A * | 4/1985 | Watanabe et al. | ............. | 296/204 |
| 5,584,525 A * | 12/1996 | Nakano et al. | ............... | 296/68.1 |
| 5,954,390 A * | 9/1999 | Kleinhoffer et al. | ...... | 296/203.01 |
| 6,053,567 A * | 4/2000 | Ito | ............................. | 296/203.01 |
| 6,431,641 B2 | 8/2002 | Miyasaka | | |
| 7,600,807 B2 * | 10/2009 | Bachmann | ............... | 296/187.08 |
| 2002/0153749 A1 * | 10/2002 | Lee | ............................ | 296/204 |
| 2009/0026799 A1 | 1/2009 | Gavrilov | | |
| 2010/0244486 A1 * | 9/2010 | Yamaki | ..................... | 296/187.08 |

* cited by examiner

*Primary Examiner* — Dennis Pedder
(74) *Attorney, Agent, or Firm* — Gregory P. Brown; Price Heneveld LLP

(57) ABSTRACT

A vehicle cross member assembly is provided which includes first and second cross members each having first and second ends, and first and second connectors connects to the first ends of the cross member to vehicle structures. The assembly includes a bracket connected to a tunnel structure on a vehicle. The bracket includes first and second brackets for connecting the second ends of the first and second cross members. At least one of the first and second cross members is configured to move laterally inward and downward into the tunnel during a sufficient lateral impact of the vehicle. Additionally, one or more seats may be mounted to the cross members such that the seats move inward and rotate away from the point of impingement during a side impact event.

17 Claims, 4 Drawing Sheets

VEHICLE CROSS MEMBER ASSEMBLY WITH TUNNEL BRACKET

FIELD OF THE INVENTION

The present invention generally relates to vehicle cross member assemblies, and more particularly relates to a cross member assembly coupled to a vehicle tunnel structure to manage side impact loads.

BACKGROUND OF THE INVENTION

Automotive vehicles are typically designed to include lateral vehicle structures to manage impact loading from side impact events. The lateral vehicle structures typically are designed to be deformable so as to absorb impact energy during a side impact event. Additionally, the lateral vehicle structures generally are designed to be sufficiently stiff such that they are able to transfer the impact load away from occupants seated in the vehicle. The absorption and transfer of impact loads generally must be balanced to provide optimal vehicle design.

SUMMARY OF THE INVENTION

According to one aspect of the present invention, a vehicle cross member assembly is provided that includes a first cross member having first and second ends, a second cross member having first and second ends, and first and second connectors. The first connector connects the first end of the cross member to a first vehicle structure, and the second connector connects the first end of the second cross member to a second vehicle structure. The assembly further includes a bracket adapted to be connected to a tunnel structure on a vehicle. The bracket comprises a first bracket connection for connecting to the second end of the first cross member and a second bracket connection for connecting to the second end of the second cross member. At least one of the first and second cross members is configured to move laterally inward and downward into the tunnel structure during a sufficient lateral impact of the vehicle.

According to another aspect of the present invention, a vehicle cross member assembly is provided that includes a cross member having first and second ends, and a connector connecting the first end of the cross member to a vehicle side structure. The assembly also includes a bracket coupled to a vehicle tunnel and connected to the second end of the cross member. The bracket is configured to allow the cross member to move laterally inward and downward into the tunnel during a side impact collision.

According to a further aspect of the present invention, a vehicle cross member seat mount assembly is provided that includes a first cross member having first and second ends, a second cross member having first and second ends, and first and second connectors. The first connector connects the first end of the first cross member to a first vehicle structure, and the second connector connects the first end of the second cross member to a second vehicle structure. The assembly further includes one or more seat mounts for mounting a seat to each of the first and second cross members. The assembly further includes a bracket adapted to be connected to a tunnel structure on a vehicle. The bracket comprises a first bracket connection for connecting to the second end of the first cross member and a second bracket connection for connecting to the second end of the second cross member. At least one of the first and second cross members is configured to move laterally inward and downward into the tunnel structure during a sufficient lateral impact of the vehicle.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
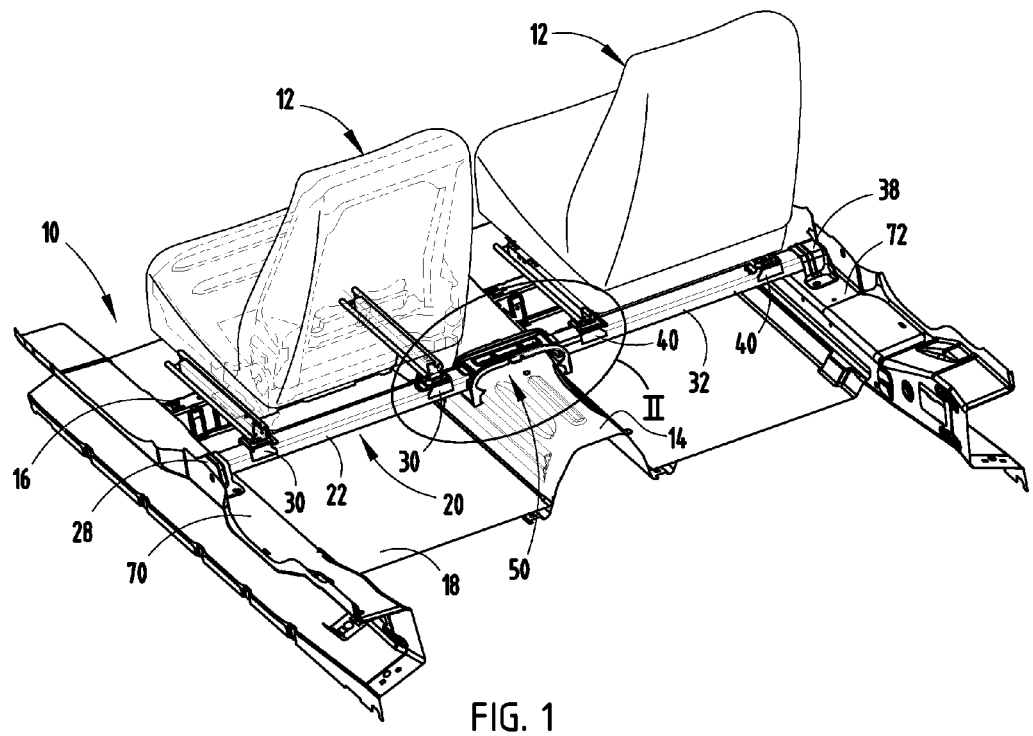
FIG. 1 is a rear perspective view of front row seats in a vehicle and a supportive cross member seat mount assembly, according to one embodiment.
Figure 2:
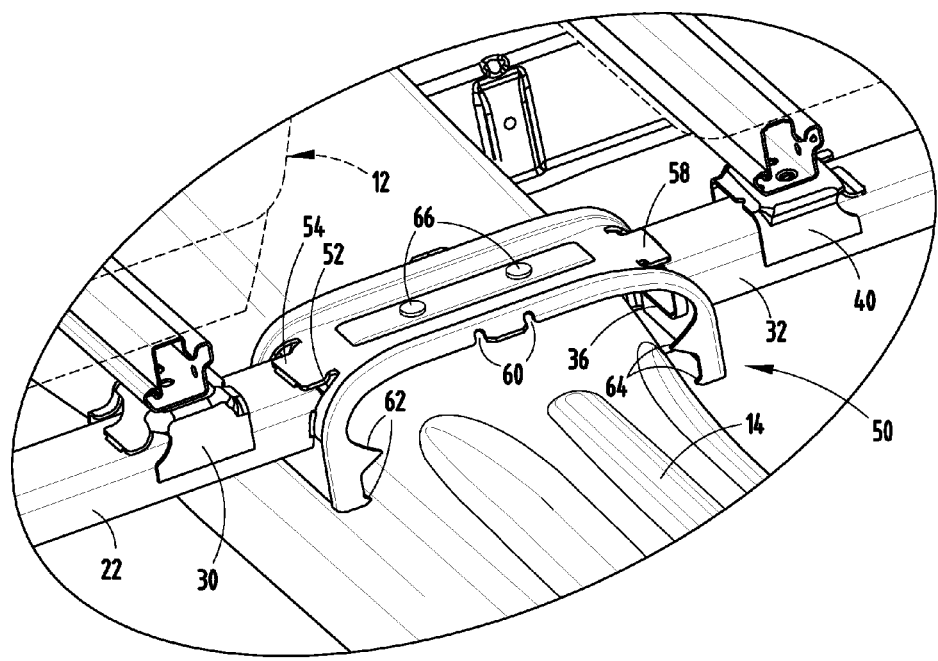
FIG. 2 is an enlarged view of section II shown in FIG. 1.
Figure 3:
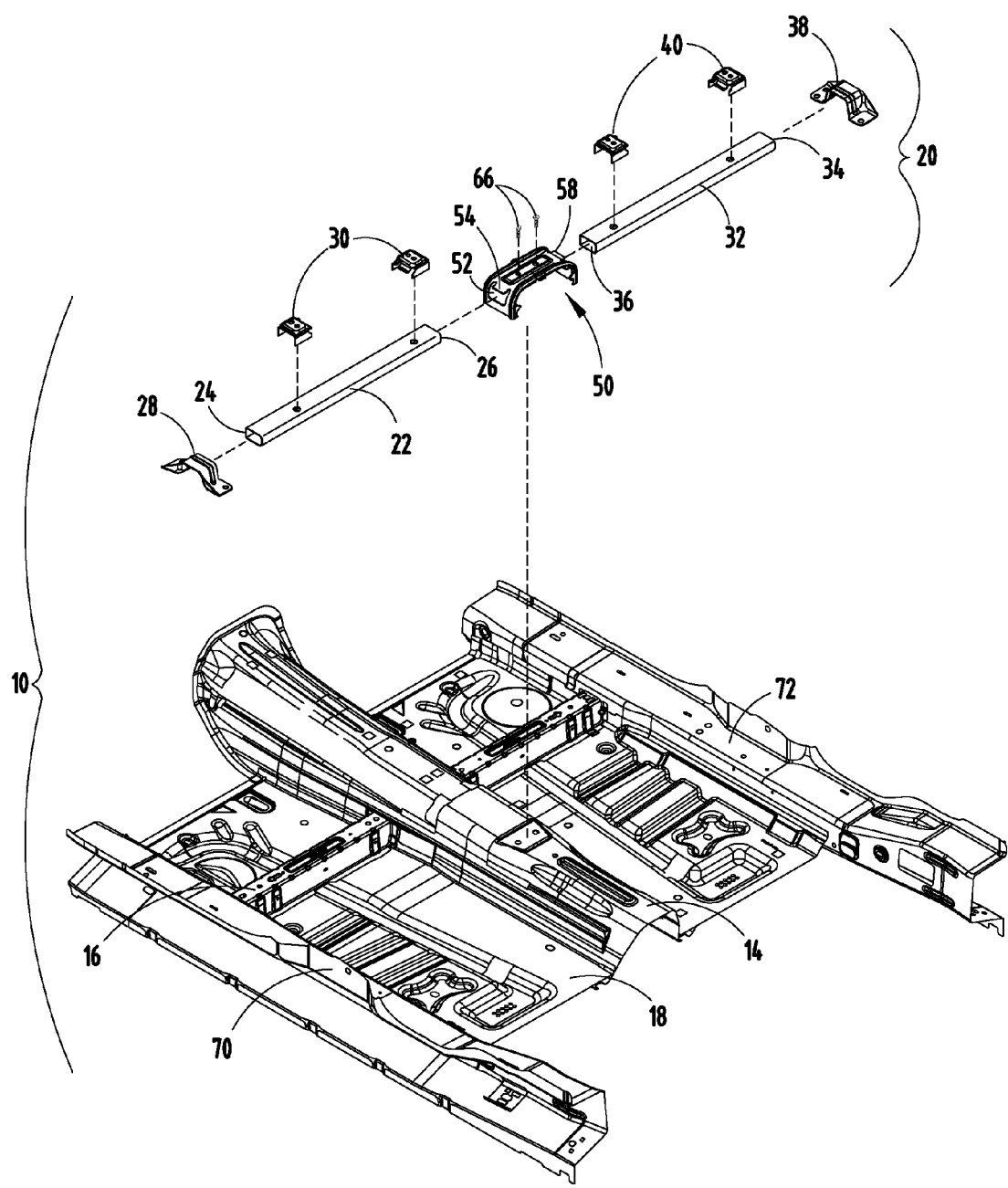
FIG. 3 is a partial exploded view of the cross member assembly exploded from the vehicle and tunnel structure.
Figure 4:
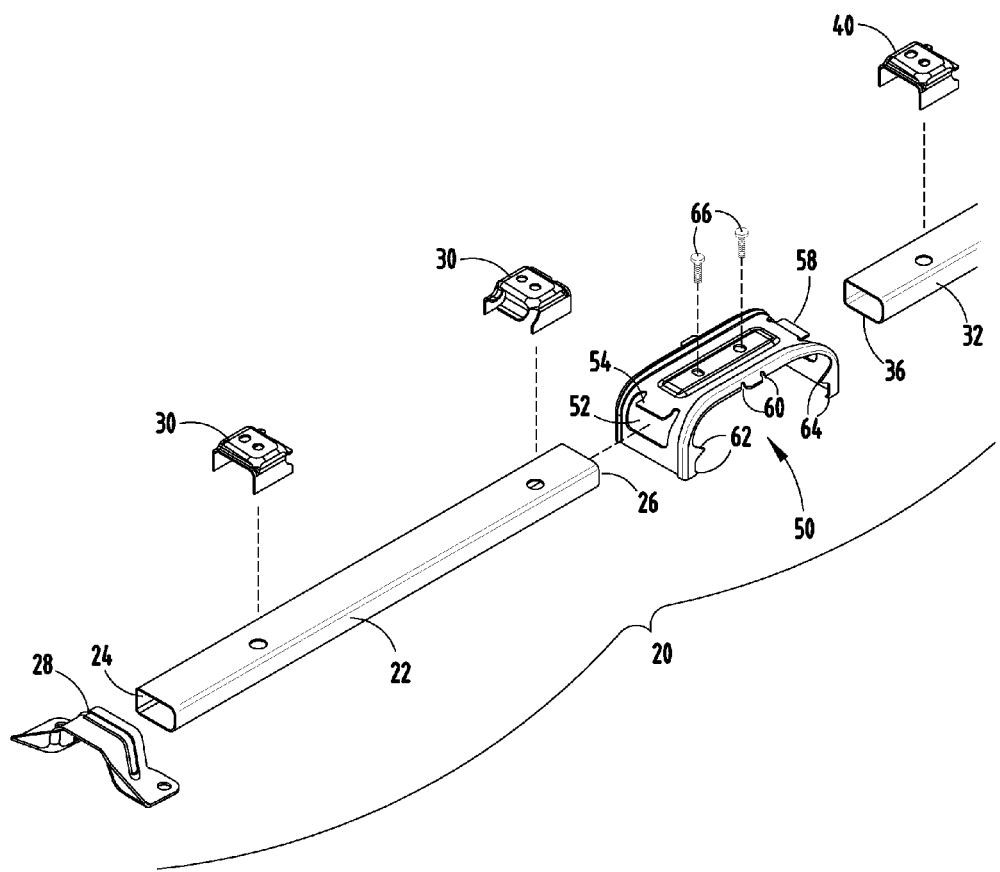
FIG. 4 is an enlarged exploded view of a portion of the cross member assembly.

For purposes of description herein, the terms "upper," "lower," "right," "left," "rear," "front," "vertical," "horizontal," and derivatives thereof shall relate to the vehicle and cross member assembly as oriented in FIG. 1 which shows an upper rear view of the vehicle and assembly. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, an automotive vehicle 10 is generally illustrated having a pair of front passenger seats 12, a longitudinally extending vehicle tunnel or tunnel structure 14 and a vehicle cross member assembly 20 oriented laterally and connected to the tunnel 14 and left and right sides of the vehicle 10. The tunnel 14 generally extends longitudinally and is elevated from the floor pan 18 and separates the passenger compartment from the drive shaft and related components underneath the vehicle 10. The tunnel 14 may be designed to crush, particularly for absorbing energy in the longitudinal direction during a frontal or rear vehicle collision. The vehicle seats 12 are mounted to support members on or near the floor pan 18. In the embodiment shown, the seats 12 are mounted on the rear side to the vehicle cross member assembly 20 via bolts fastened to seat risers 40 and on the front side to a floor pan mounted support 16 via bolts.

The side impact vehicle cross member assembly 20 is designed so that during a side impact event a substantial portion of the vehicle underbody deformation occurs primarily in the area of the tunnel 14 which results in energy absorption and also translation of the adjacent seat 12 away from the vehicle side door and the impinging member impacting the vehicle 10 during the side impact event. In addition, the design of the cross member assembly 20 allows the seat 12 to rotate away from the intruding or impinging member impacting the side of the vehicle. The energy absorption and controlled seat kinematics provided by the cross member assembly 20 reduces the occupant load from the intruding door during a side impact event.

Referring to FIGS. 1-4, the vehicle cross member assembly 20 is illustrated having a first cross member 22 with a first end 24 and second end 26, and a second cross member 32 with a first end 34 and a second end 36. The first and second cross members 22 and 32 are stiff members or beams that are not intended to be deformable during a side impact event, and may be roll-formed with a closed end and made of high strength steel. According to one embodiment, the cross members 22 and 32 may have a hollow rectangular shape as shown, however, cross members 22 and 32 may otherwise be designed with different shapes and sizes. Cross member 22 is shown having a pair of seat risers 30 assembled on top thereof which serve as seat mounts onto which the rear support of a seat 12 may be mounted. Similarly, cross member 32 has a pair of seat risers 40 assembled on top thereof which serve as seat mounts onto which the rear support of a seat 12 may be mounted.

The vehicle cross member assembly 20 includes a first side connector 28 for connecting the first end 24 of cross member 22 to a vehicle structure. First connector 28 is shown as a side bracket which is fastened or welded to a bulkhead reinforcement 70 inside the rocker of the vehicle 10. The assembly 20 also includes a second side connector 32 connecting the first end 34 of second cross member 32 to a vehicle structure. The second connector 38 likewise includes a side bracket that is fastened or otherwise welded to a bulkhead reinforcement 72 inside the rocker of the vehicle 10.

The vehicle cross member assembly 20 further includes a tunnel mounted bracket 50 mounted to the vehicle tunnel 14. The bracket 50 may be screwed or fastened onto the top of the tunnel 14 by fasteners (e.g., screws or bolts) 66. Bracket 50 may be made of a deformable metal such as high strength steel HSLA350 and has a generally C-shape with inward projecting teeth 62 and 64 on opposite sides for engaging and grabbing the outer side wall surface of the tunnel structure 14. The bracket 50 has a first bracket connection 52 for connecting to the second end 26 of first cross member 22. The second end 26 of cross member 22 extends within an opening forming the connection of bracket 50 and has a tongue 54 welded or otherwise attached to the top surface of the second end 26 of cross member 22. The bracket 50 also includes a second bracket connection 56 for connecting to the second end 36 of second cross member 32. The second bracket connection 56 has an opening for receiving the second end 36 of cross member 32 and a tongue 58 that is welded or otherwise attached to the top surface of the second end 36 of cross member 32. The tongues 54 and 58 are shown as tabs that bend downward at an angle and lay on a top surface of the corresponding cross member. The tunnel bracket 50 is configured to deform during a side impact of the vehicle 10 so as to absorb energy when the corresponding one of the first and second cross members 22 and 32 is moved laterally inward towards the tunnel 14. In the embodiment shown with the seats 12 mounted to the cross member assembly, a sufficient side impact force applied to the vehicle 10 such as during a collision causes the cross members 22 and 32 to move inward the central longitudinal axis of the tunnel 14 and downward so as to crush into the tunnel 14 which causes a seat 12 on the corresponding side to move inward and rotate away from the impinging object causing the side impact, thereby absorbing energy and moving a passenger seated in the seat 12 away from the point of impact.

The tunnel bracket 50 has teeth 62 and 64 that grab the tunnel structure 14. Additionally, the tongues 54 and 58 serves as an energy absorbing devices that allows tuneability between energy absorption and cross member displacement during a side impact event. The bracket 50 also has a pair of notches 60 that allow the bracket 50 to bend downward during a side impact event. The size, shape, number and location of the notches 60 may be selected to achieve the desired bending of bracket 50 for a side impact event. Accordingly, the bracket 50 is designed such that the cross members 22 and 32 move laterally inward towards the tunnel 14 and downward during a side impact event such that the bracket 50 bends and crushes the tunnel 14 as cross members 22 and 32 are forced inward and downward into the tunnel 14. The tunnel 14 thereby is used as an energy absorbing device during a lateral (side) impact event.

Figure 5:
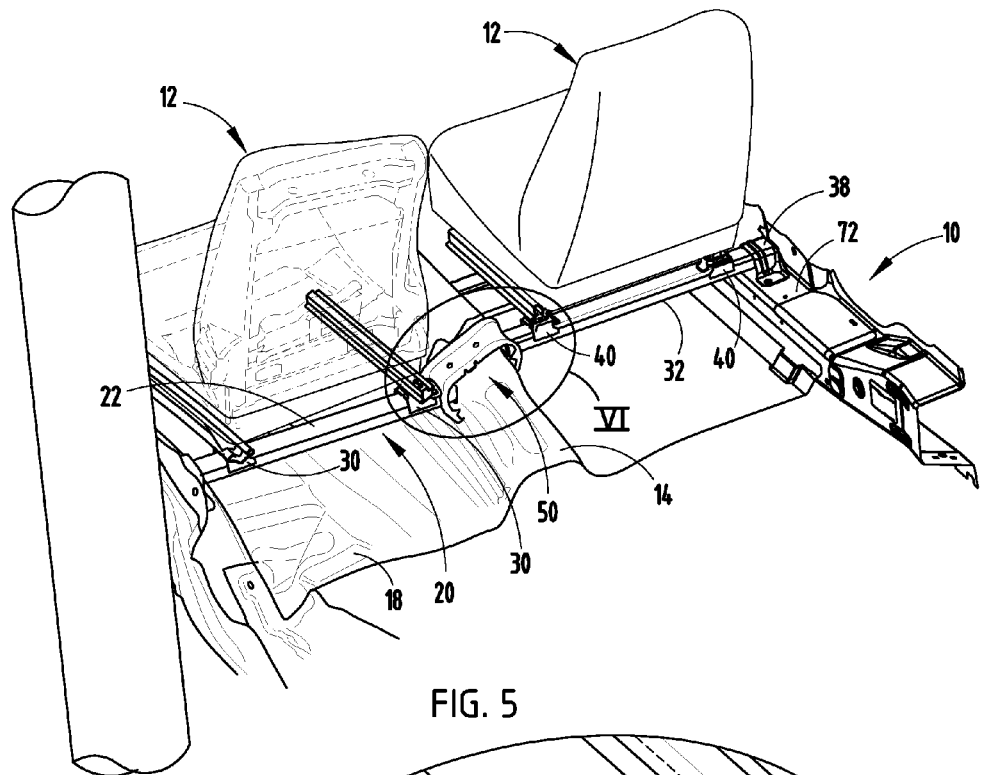
FIG. 5 is a rear perspective view of the vehicle seat and cross member assembly following a side impact event.
Figure 6:
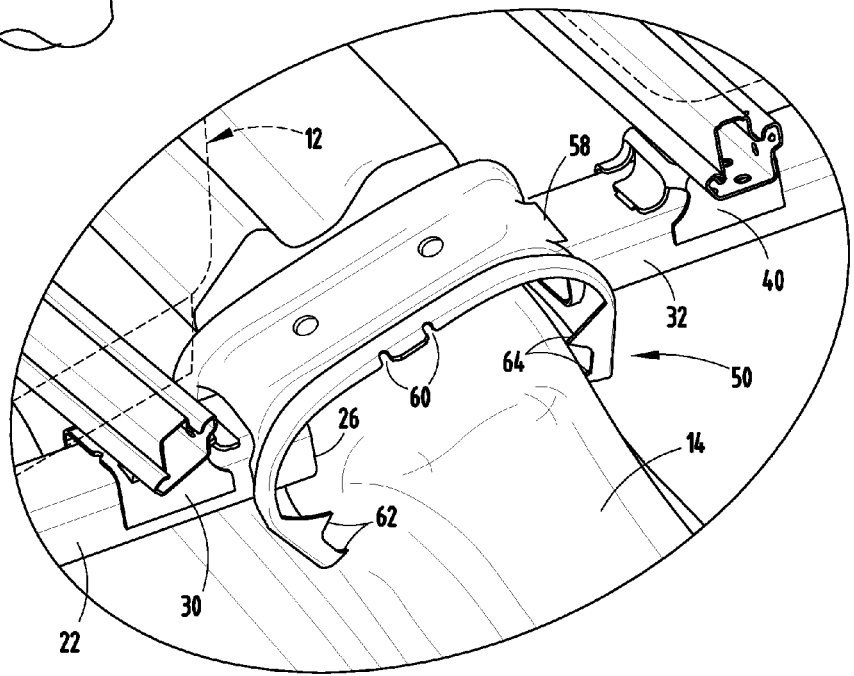
FIG. 6 is an enlarged view of section VI of FIG. 5 showing the collapse of the cross member assembly with the tunnel structure.

The vehicle cross member assembly 20 is further illustrated in FIGS. 5 and 6 shown following a side impact event. As shown, the cross member assembly 20 on the left side of the vehicle is forced laterally inward and downward when an object impacts the left side of the vehicle such that the cross bar member 22 on the same side of the impinging object moves in and down into the tunnel 14 such that the seat 12 mounted thereto moves laterally inward and is rotated inward and away from the impinging force of the lateral side impact event.

The vehicle cross member assembly 20 may be used to absorb energy for a side impact event with or without the assembly of one or more seats 12 thereon. In one embodiment, passengers seats 12 are mounted to the cross bar members 22 and 32. However, it should be appreciated that the assembly 20 may be employed without such a seat mounting arrangement. It is further contemplated that the assembly 20 may be configured with a single cross member connected to a tunnel bracket on one end and vehicle structure on the other end, independent of any other cross member, according to a further embodiment.

Accordingly, the vehicle cross member assembly 20 advantageously absorbs energy during a lateral side impact. Additionally, the vehicle cross member assembly 20 translates one or more members, such as a vehicle seat 12, away from the intruding side impact member. This is particularly useful for a seating arrangement in which the seat and the occupant seated therein is translated away from the point of impingement while at the same time absorbing energy due to the side impact event.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle cross member assembly comprising:
    a first straight cross member having first and second ends;
    a second straight cross member having first and second ends, wherein the first and second cross members are separated from a vehicle floor;
    a first connector connecting the first end of the first cross member to a first vehicle structure;
    a second connector connecting the first end of the second cross member to a second vehicle structure; and
    a bracket adapted to be connected near a top of a tunnel structure on a vehicle, said bracket comprising a first bracket connection for connecting to the second end of the first cross member and a second bracket connection for connecting to the second end of the second cross member, wherein at least one of the first and second cross members is configured to move laterally inward and downward into the tunnel structure during a sufficient lateral impact of the vehicle, wherein the first bracket connection comprises a first opening for receiving the second end of the first cross member and the second bracket connection comprises a second opening for receiving the second end of the second cross member, and wherein the bracket absorbs energy when at least one of the first and second cross members moves laterally into the tunnel.

2. The assembly as defined in claim 1, wherein the first bracket connection comprises a first tongue connected to the first end of the first cross bar member for absorbing energy during a side impact event, and the second bracket connection comprises a second tongue connected to the first end of the second cross member for absorbing energy during a side impact event.

3. The assembly as defined in claim 1, wherein the first cross member comprises one or more seat mounts for mounting to a vehicle seat, wherein at least one of the first and second cross members during a lateral impact event causes the seat to move inward and rotate inward away from the impinging point of lateral impact.

4. The assembly as defined in claim 3, wherein the one or more seat mounts comprise seat risers for mounting to the vehicle seat.

5. The assembly as defined in claim 1, wherein the first and second vehicle structures are longitudinal members.

6. The assembly as defined in claim 1, wherein the bracket comprises a substantially C-shaped bracket engaged to the vehicle tunnel.

7. A vehicle cross member assembly comprising:
a first straight cross member having first and second ends;
a second straight cross member having first and second ends, wherein the first and second cross members are separated from a vehicle floor;
a first connector connecting the first end of the first cross member to a first vehicle structure;
a second connector connecting the first end of the second cross member to a second vehicle structure; and
a bracket adapted to be connected near a top of a tunnel structure on a vehicle, said bracket comprising a first bracket connection for connecting to the second end of the first cross member and a second bracket connection for connecting to the second end of the second cross member, wherein at least one of the first and second cross members is configured to move laterally inward and downward into the tunnel structure during a sufficient lateral impact of the vehicle, and wherein the bracket further comprises one or more notches that assist in the downward motion of the at least one of the first and second cross members.

8. A vehicle cross member assembly comprising:
a straight cross member having first and second ends;
a connector connecting the first end of the cross member to a vehicle side structure at a location separated from a vehicle floor; and
a bracket coupled near a top of a vehicle tunnel and having an opening receiving the second end of the cross member, said bracket configured to allow the cross member to move laterally inward and downward into the tunnel during a side impact collision.

9. The assembly as defined in claim 8, wherein the bracket absorbs energy when the cross member moves laterally into the tunnel.

10. The assembly as defined in claim 9, wherein the bracket further comprises a tongue connected to the first end of the cross bar member for absorbing energy during a side impact event.

11. The assembly as defined in claim 8, wherein the cross member comprises one or more seat mounts for mounting to a vehicle seat, wherein the cross member during a lateral impact causes the seat to move inward and rotate inward away from an impinging side impact object.

12. The assembly as defined in claim 10, wherein the cross member comprises one or more seat risers for mounting to the vehicle seat.

13. The assembly as defined in claim 8, wherein the first and second vehicle structures are longitudinal members.

14. The assembly as defined in claim 8, wherein the bracket comprises a substantially C-shaped bracket engaged to the vehicle tunnel.

15. The assembly as defined in claim 8 further comprising:
another straight cross member having first and second ends;
another connector connecting the first end of the another cross member to another vehicle structure, wherein the another cross member is separated from the vehicle floor; and
another bracket connection on the bracket for connecting to the second end of the another cross member, wherein the another cross member is configured to move laterally inward and downward into the tunnel during a sufficient lateral impact of the vehicle.

16. A vehicle cross member seat mount assembly comprising:
a first straight cross member having first and second ends;
a second straight cross member having first and second ends, wherein the first and second cross members are separated from the vehicle floor;
a first connector connecting the first end of the first cross member to a first vehicle structure;
a second connector connecting the first end of the second cross member to a second vehicle structure;
one or more seat mounts for mounting a seat to each of the first and second cross members; and
a bracket adapted to be connected near a top of a tunnel structure on a vehicle, said bracket comprising a first bracket connection for connecting to the second end of the first cross member and a second bracket connection for connecting to the second end of the second cross member, wherein at least one of the first and second cross members is configured to move laterally inward and downward into the tunnel structure during a sufficient lateral impact of the vehicle, wherein the first bracket connection comprises a first opening for receiving the second end of the first cross member and the second bracket connection comprises a second opening for receiving the second end of the second cross member, wherein at least one of the brackets absorb energy when at least one of the first and second cross members moves laterally into the tunnel.

17. The assembly as defined in claim 16 further comprising one or more seat risers for mounting the seat to the first and second cross members.

* * * * *